United States Patent [19]

Clark

[11] 4,114,854

[45] Sep. 19, 1978

[54] SCISSORS LIFT WORK PLATFORM

[75] Inventor: Albert L. Clark, West Bend, Wis.

[73] Assignee: Pac-Craft Products, Inc., West Bend, Wis.

[21] Appl. No.: 805,262

[22] Filed: Jun. 10, 1977

[51] Int. Cl.[2] .............. B60P 1/02

[52] U.S. Cl. .............. 254/122; 214/512; 187/18

[58] Field of Search .............. 214/512; 254/122; 187/18; 182/141, 157

[56] References Cited

U.S. PATENT DOCUMENTS

| | | | |
|---|---|---|---|
| 2,533,980 | 12/1950 | Weaver | 254/122 X |
| 3,664,459 | 5/1972 | Stephens et al. | 187/18 X |

*Primary Examiner*—Albert J. Makay

*Attorney, Agent, or Firm*—Wheeler, Morsell, House & Fuller

[57] ABSTRACT

A lift with a work platform supported by a scissors linkage on a base includes a single hydraulic cylinder for elevating the linkage. The cylinder is connected between a lower link and a swing arm which is pivotally connected to the linkage. During a first lifting stage the swing arm bears against a cam surface on the uppermost link to cause an initial unfolding action of the upper links. Prior to the arm leaving the cam surface, the arm bears against an abutment on one of the lower links for a second lifting stage to cause unfolding of the linkage from the bottom. This arrangement provides a strong, smooth unfolding of the linkage. The base is provided with outriggers which can be folded against the sides of the base when not in use and which are pivoted to a transverse position for use. Links connecting the outriggers to a guide track enable positive locking of the outriggers in the operative position.

3 Claims, 8 Drawing Figures

SCISSORS LIFT WORK PLATFORM

BACKGROUND OF INVENTION

The invention relates to a scissors linkage lift which employs power cylinders for folding and unfolding the linkage. In some prior art devices two hydraulic cylinders are typically employed with connections at different points on the lift to obtain the necessary mechanical advantage to unfold the linkage. Some prior art devices which employ one or two hydraulic cylinders have an erratic and nonuniform lifting speed.

SUMMARY OF INVENTION

The invention provides a power cylinder lifting arrangement for a scissors linkage which folds the linkage compactly in a collapsed position and unfolds the linkage using a single hydraulic cylinder which acts through a swing arm to provide unfolding of the linkage in two stages. The swing arm has two cam followers which engage cam surfaces on the upper links in the form of a pair of plates with ramps. In the first unfolding stage, the cam followers bear against the cam surfaces to cause initial unfolding action of the linkage. Before the cam followers leave the ramps, the swing arm engages and bears against an abutment connected to the lower links to cause the final unfolding movement of the linkage. The unfolding movement during the two stages is smooth and uniform.

The invention also includes outriggers which are pivoted to the base and movable from the folded position against the base of the lift to a transverse extended supportive position. Links connected intermediate the length of the outriggers are provided with a slide which travels in guide tracks along the base to control swinging movement of the outrigger from the folded to the extended position. The slide is locked in the channel by a spring lock when the link swings to the end of the channel.

Further objects, advantages and features of the invention will become apparent from the disclosure hereof.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
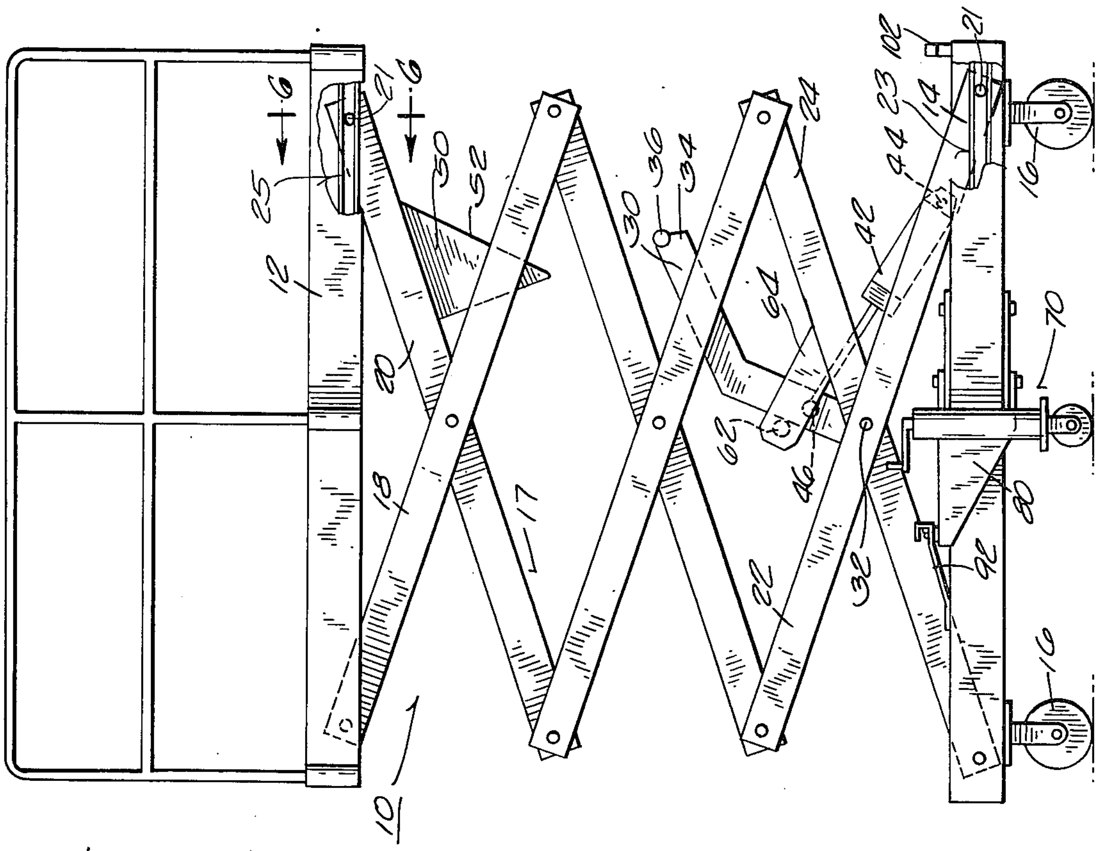
FIG. 1 is a side elevational view of a lift in accordance with the invention in a partially extended position.
Figure 3:
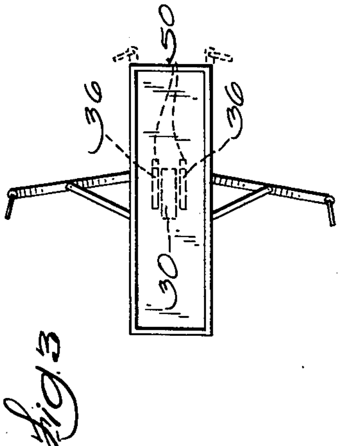
FIG. 3 is a plan view on a reduced scale showing the outriggers in extended position.
Figure 6:
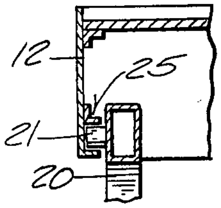
FIG. 6 is a sectional view along line 6—6 of FIG. 1.

FIG. 1 shows a lift 10 which has a work platform 12 and a base 14 provided with wheels 16. The work platform is supported above the base 14 by a scissors linkage 17 which has spaced links on opposite sides of the platform with the upper links 18 and 20 connected to the platform 12 and the lower links 22 and 24 connected to the base 14. The links 20 and 22 have rollers 21 which respectively ride in tracks 23 and 25 on the platform 12 and base 14 (FIG. 6).

Figure 2:
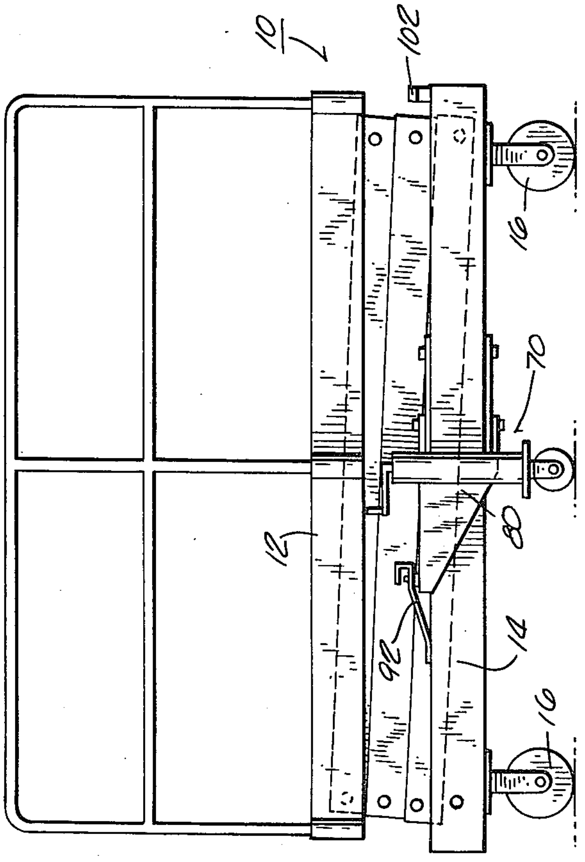
FIG. 2 is a view similar to FIG. 1 showing the lift in the stowed position.
Figure 8:
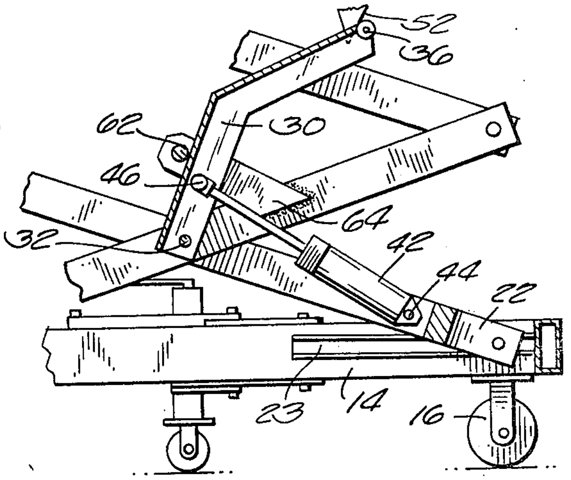
FIG. 8 is a view similar to FIG. 7 of the linkage showing the linkage in the second unfolding stage.
Figure 7:
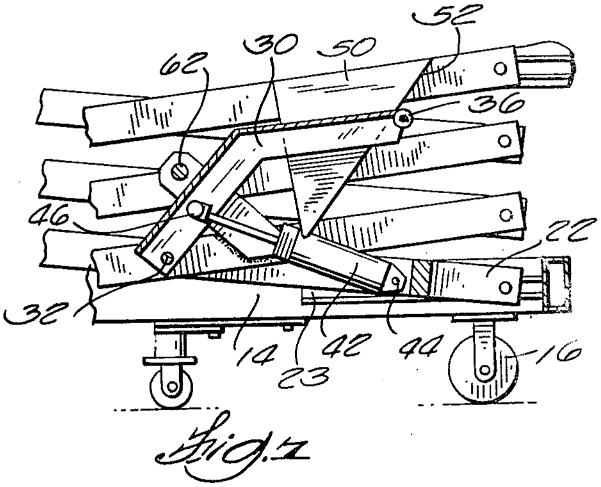
FIG. 7 is a fragmentary side elevational view of the scissors linkage in the first unfolding stage.

In accordance with the invention, means are provided for initially applying an unfolding force to the upper links and subsequently applying an unfolding force to the lower links 22 and 24. In the disclosed construction, the means includes arm 30 which is pivotally supported on the pivot 32 which connects the links 22 and 24. The free end 34 of the arm 30 is provided with a pair of rollers 36 for purposes subsequently described. In FIG. 7, the swing arm 30 is shown in a partially folded position and is movable from this position to the unfolded position shown in FIGS. 1 and 8 and a completely folded position in which the linkage is shown in FIG. 2 by a power cylinder 42 pivotally connected at 44 to link 22 and pivotally connected at 46 to the swing arm 30.

The two spaced upper links 20 are provided with plates 50 which have ramps or cam surfaces 52 which cooperate with the cam followers or rollers 36 on the arm 30. When the scissors linkage is in the partially collapsed position shown in FIG. 7, the rollers 36 are in engagement with the cam surfaces 52. Actuation of the power cylinder 42 causes the swing arm 30 to swing in an arc pivot 32 with the rollers 36 bearing against the cam surfaces 52 to raise the upper links 18 and 20 through a first unfolding stage. As the unfolding of the upper links 18 and 20 progresses, the rollers 36 approach the lower end of the cam surface 52 and the arm 30 hits a rod or abutment 62 which spans the linkage and is supported by two brackets 64 fixed to the links 24. When the swing arm 30 is engaged with the abutment 62, the power cylinder then is acting against the links 24 to provide a second stage of unfolding force from the bottom of the linkage rather than the top as with the first stage as the arm swings in a second arc. The platform 12 is elevated to its desired working position during the second stage. The use of the swing arm 30 and cam surfaces 52 enable the use of a single hydraulic cylinder as disclosed herein with the linkage being collapsible or retractable to a very compact level as shown in FIG. 2. The cam surfaces provide good mechanical advantage for smooth unfolding movement during the first stage without the abrupt and erratic motions of prior art scissor lifts.

Figure 4:
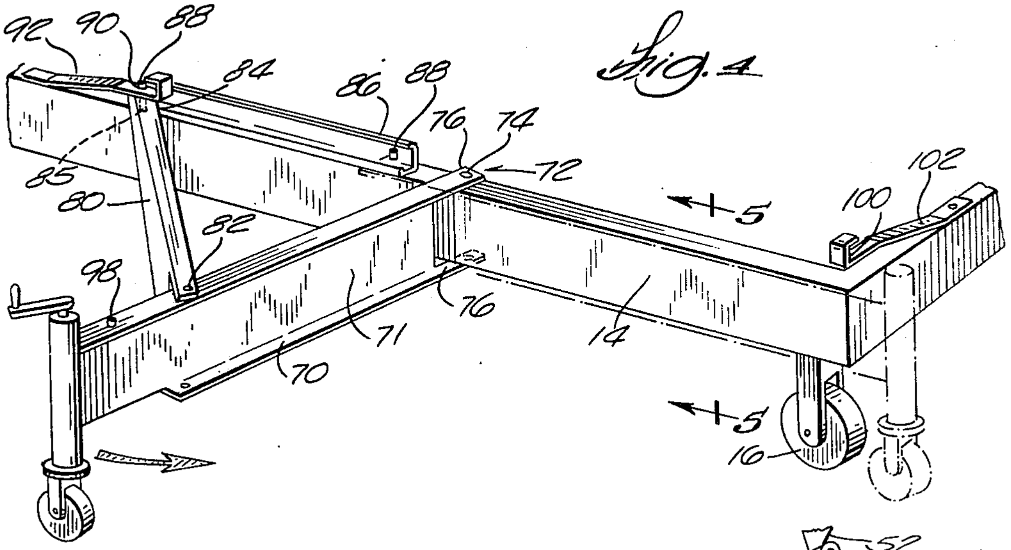
FIG. 4 is a fragmentary perspective view showing an outrigger in extended position.
Figure 5:
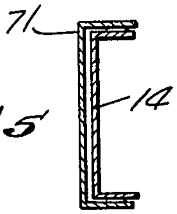
FIG. 5 is a sectional view along line 5—5 of FIG. 4.

The invention also provides folding outriggers to provide support for the lift. As shown in FIG. 4, the outrigger 70 includes a channel member 71 which is pivotally connected to the base 14 at 72 by bolts 74 or the like which extend through tabs 76 which extend from the channel member 71. The pivots 74 enable the outrigger to be folded along the base 14 as shown in FIG. 5 when the outriggers 70 are not in use to minimize the width of the lift.

The outrigger is positively fixed in the extended operative position of FIG. 4 by a link 80 which is pivotally connected at 82 to the member 70 intermediate its length. The link 80 is provided with a slide 84 which can be the head of a bolt 85 which travels in a track 86 secured to the base. The end of the link 80 moves along the track 86 from the dotted line position shown in FIG. 4 to the full line position as the outrigger 70 is swung to the extended position. The link 80 is provided with engagement means which can be the upstanding end 88 of the bolt which snaps into an aperture 90 in a leaf spring member 92 to positively position the outrigger 70 in the operative position. To fold the outrigger to the stowed position, the spring 92 is lifted to release the bolt. In the folded position, upstanding projection 98 on the outrigger 70 snaps into an aperture 100 in the leaf spring 102.

In use, the arm 30 causes a partial opening of the linkage and thus changes the angle of the links before the power cylinder causes lifting from the bottom of the linkage. This gives the power cylinder a greater leverage advantage and lessens the strain on the linkage, reduces friction and strain on the linkage pivots and provides a smooth lifting movement. Although the cam surfaces are disclosed herein on the upper links, some of the advantages of the invention can be obtained if the cam surfaces are on intermediate links.

What I claim is:

1. In a scissors lift supported on a base and having a work platform and a scissors linkage having two spaced sets of links connecting said base and said platform for elevating said platform above said base to a working position, each of said sets of links having first and second lower links pivotally connected together, with said first links being pivotally connected to said frame by a fixed pivot and said second links being provided with a roller at the end of said second links, and tracks on said base for confining and providing guided movement of said roller during raising and lowering of said linkage, the improvement comprising an arm, means for pivotally connecting said arm to one of said links, said arm having a free end, a cam surface on another of said links, an abutment on one of said links, and power cylinder means having one end pivotally connected to said arm intermediate its length and said cylinder having another end directly pivotally connected to said second links between said connection of said second links and said roller on said second links to swing said arm about its pivotal connection through a first arc portion in which said free end is engaged with and bears against said cam surface to cause unfolding of said linkage to a partially extended position and to cause further movement of said arm through a second arc portion when said arm bears against said abutment to raise said linkage from the partially extended position to the fully extended position.

2. The improvement of claim 1 wherein said cam surface is on an upper link and comprises a ramp extending at an angle with respect to said link.

3. The improvement of claim 1 wherein said swing arm is located intermediate the spaced links and pivotally supported on the connection between two of said links.

* * * * *